(12) United States Patent
Gupta (10) Patent No.: US 10,097,493 B2
(45) Date of Patent: *Oct. 9, 2018

(54) MANAGING AN ELECTRONIC MAIL IN A COMMUNICATION NETWORK

(71) Applicant: International Business Machines Corporation, Armonk, NY (US)

(72) Inventor: Deepak Gupta, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,931

(22) Filed: Jan. 4, 2017

(65) Prior Publication Data

US 2017/0118155 A1 Apr. 27, 2017

Related U.S. Application Data

(63) Continuation of application No. 13/794,955, filed on Mar. 12, 2013, now Pat. No. 9,590,937, which is a
(Continued)

(51) Int. Cl.
*G06F 15/16* (2006.01)
*H04L 12/58* (2006.01)
(Continued)

(52) U.S. Cl.
CPC ............ *H04L 51/18* (2013.01); *G06F 3/0481* (2013.01); *G06F 3/0482* (2013.01); *H04L 51/00* (2013.01);
(Continued)

(58) Field of Classification Search
CPC ........ H04L 51/18; G06F 3/0481; G06F 3/0482
(Continued)

(56) References Cited

U.S. PATENT DOCUMENTS 5,852,818 A * 12/1998 Guay ................ G06F 17/30595
6,775,689 B1     8/2004 Raghunandan
(Continued)

OTHER PUBLICATIONS

Anderung, Letzte; How to Install and Use IDW's PGP-Frontend for Pegasus Mail (6.2.7.1/9-2009); Sep. 19, 2009; http://www.pmpgp.de/pmpgp/manualen.htm; 12 pages.
(Continued)

*Primary Examiner* — Vivek Srivastava
*Assistant Examiner* — Atta Khan
(74) *Attorney, Agent, or Firm* — Schmeiser, Olsen & Watts, LLP; John Pivnichny (57) ABSTRACT

A method for managing an electronic mail. A command list of a communication electronic mail transmission protocol is partitioned into command sub-lists using recursive parameters appearing in the command list prior to the partitioning of the command list. Each recursive parameter is a command that is repeated in respective command sub-lists as a result of the partitioning. Each command sub-list includes at least one command pertaining to a receiver or sender of the electronic mail. Each command sub-list is individually selectable for subsequent use of the at least one command in a subsequently selected command sub-list in implementing the electronic mail. A selection of at least one of the command sub-lists viewable in a user interface is received. Each command of the at least one command specifies a respective aspect of how to implement the electronic mail in a subsequent implementation of the electronic mail.

20 Claims, 7 Drawing Sheets

Related U.S. Application Data continuation of application No. 12/786,476, filed on May 25, 2010, now Pat. No. 8,429,237.

(51) Int. Cl.
*G06F 3/0481* (2013.01)
*H04L 29/06* (2006.01)
*G06F 3/0482* (2013.01)

(52) U.S. Cl.
CPC .............. *H04L 51/34* (2013.01); *H04L 63/20* (2013.01); *H04L 67/42* (2013.01)

(58) Field of Classification Search
USPC ........................................................ 709/206
See application file for complete search history.

(56) References Cited

U.S. PATENT DOCUMENTS

| | | | |
|---|---|---|---|
| 6,789,107 B1 | 9/2004 | Bates et al. | |
| 6,912,656 B1 | 6/2005 | Perlman et al. | |
| 6,970,907 B1 | 11/2005 | Ullmann et al. | |
| 7,389,422 B2 | 6/2008 | Banerjee et al. | |
| 8,429,237 B2 | 4/2013 | Gupta | |
| 8,478,981 B2* | 7/2013 | Khan | H04L 51/063 713/150 |
| 2004/0054737 A1* | 3/2004 | Daniell | G06Q 10/107 709/206 |
| 2004/0221011 A1* | 11/2004 | Smith | H04L 51/28 709/206 |
| 2004/0260756 A1* | 12/2004 | Forstall | G06Q 10/107 709/200 |
| 2005/0223066 A1* | 10/2005 | Buchheit | G06Q 10/107 709/206 |
| 2007/0005715 A1* | 1/2007 | LeVasseur | G06Q 10/107 709/206 |
| 2007/0288859 A1 | 12/2007 | Vuong et al. | |
| 2008/0072157 A1 | 3/2008 | Pally | |
| 2008/0192302 A1 | 8/2008 | Rohall et al. | |
| 2008/0235345 A1 | 9/2008 | Banerjee et al. | |
| 2008/0235797 A1 | 9/2008 | Banerjee et al. | |
| 2010/0049978 A1 | 2/2010 | Ogawa et al. | |
| 2011/0296316 A1* | 12/2011 | Gupta | G06F 3/0481 715/752 |
| 2013/0191482 A1 | 7/2013 | Gupta | |

OTHER PUBLICATIONS

Office Action (dated Aug. 23, 2012) for U.S. Appl. No. 12/786,476, filed May 25, 2010.
Amendment filed Nov. 21, 2012 in response to Office Action (dated Aug. 23, 2012) for U.S. Appl. No. 12/786,476, filed May 25, 2010.
Notice of Allowance (dated Dec. 21, 2012) for U.S. Appl. No. 12/786,476, filed May 25, 2010.
Office Action (dated Mar. 26, 2015) for U.S. Appl. No. 13/794,955, filed Mar. 12, 2013.
Amendment (dated Jun. 25, 2015) for U.S. Appl. No. 13/794,955, filed Mar. 12, 2013.
Final Office Action (dated Oct. 7, 2015) for U.S. Appl. No. 13/794,955, filed Mar. 12, 2013.
Final Amendment (dated Dec. 7, 2015) for U.S. Appl. No. 13/794,955, filed Mar. 12, 2013.
Advisory Action (dated Dec. 30, 2015) for U.S. Appl. No. 13/794,955, filed Mar. 12, 2013.
RCE (Dec. 31, 2015) for U.S. Appl. No. 13/794,955, filed Mar. 12, 2013.
Office Action (dated Jun. 16, 2016) for U.S. Appl. No. 13/794,955, filed Mar. 12, 2013.
Amendment (dated Sep. 12, 2016) for U.S. Appl. No. 13/794,955, filed Mar. 12, 2013.
Notice of Allowance (dated Oct. 24, 2016) for U.S. Appl. No. 13/794,955, filed Mar. 12, 2013.
https://technet.microsoft.com/en-us/library/aa996114(v=exchg.65). aspx, "SMTP Commands and Definitions", retrieved on Sep. 11, 2016 from the Internet: <URL, 5 pages.

* cited by examiner

MANAGING AN ELECTRONIC MAIL IN A COMMUNICATION NETWORK

This application is a continuation application claiming priority to Ser. No. 13/794,955, filed Mar. 12, 2013, now U.S. Pat. No. 9,590,937, issued Mar. 7, 2017, which is a continuation of Ser. No. 12/786,476, filed May 25, 2010, U.S. Pat. No. 8,429,237, issued Apr. 23, 2013.

BACKGROUND OF THE INVENTION

Simple Mail Transfer Protocol (SMTP) is an Internet standard for electronic mail (hereinafter referred to as e-mail) transmission across Internet Protocol (IP) networks. While electronic mail servers and other mail transfer agents use SMTP to send and receive mail messages, user-level client mail applications typically use SMTP for sending messages to a mail server. Client applications may use the Post Office Protocol (POP) or the Internet Message Access Protocol (IMAP) to access their mail box accounts on a mail server.

SMTP is a relatively simple, text-based protocol, in which a mail sender communicates with a mail receiver by issuing simple command strings and supplying necessary data over a reliable ordered data stream channel, typically a Transmission Control Protocol (TCP) connection. An SMTP session includes a series of commands or a list of commands initiated by the SMTP client and responses from an SMTP server through which the SMTP session is opened. In the SMTP session, operating parameters are also exchanged, recipients are specified, and possibly verified, and a message is transmitted before the session is closed. The originating host of a message is either an end-user's e-mail client also known as mail user agent (MUA), or a relay server's mail transfer agent (MTA).

SMTP was designed as an electronic mail transport and delivery protocol, and as such it is used between SMTP systems that are operational on a continuous basis. POP and IMAP are preferred protocols when a user's personal computer is only intermittently powered up, or Internet connectivity is only transient and hosts cannot receive messages during off-line periods.

Current SMTP protocol allows for one parameter "DATA" used in a command list irrespective of whether it is an initial e-mail or a forwarded/reply-with-history e-mail. So, when a user sends a forwarded e-mail along with the user's own e-mail and/or does a reply-with-history, the entire content including the user's own text is sent as a single message.

BRIEF SUMMARY OF THE INVENTION

Aspects of the invention are directed to a method, a system, and a computer program product for managing an electronic mail in a communication network.

According to one aspect of the invention, a method for managing an electronic mail in a communication network is disclosed. The method includes providing a plurality of recursive parameters in a command list of a communication protocol associated with the electronic mail, wherein at least one of the recursive parameters is a DATA parameter specifying information of the electronic mail and partitioning the command list into a plurality of command sub-lists using the plurality of recursive parameters. The communication protocol is at least one of a Simple Mail Transfer Protocol, Post Office Protocol or Internet Message Access Protocol. The method further includes preserving at least one property (e.g., cipher) corresponding to each of the command sub-lists. The at least one property is selected from a set including an encryption key, a digital signature, a return receipt, a priority, a confidentiality and a mood stamp corresponding to each of the command sub-lists. The method further includes providing an interface for selecting each of the command sub-lists, selecting at least one of the command sub-lists, and identifying the at least one property corresponding to each of the command sub-lists

BRIEF DESCRIPTION THE DRAWINGS

Embodiments of the present invention are described in detail below, by way of example only, with reference to the following schematic drawings, where.

DETAILED DESCRIPTION OF THE INVENTION

Aspects of the invention describe, in various exemplary embodiments, a system, a method and a computer program product for managing an electronic mail in a communication network.

Figure 1:
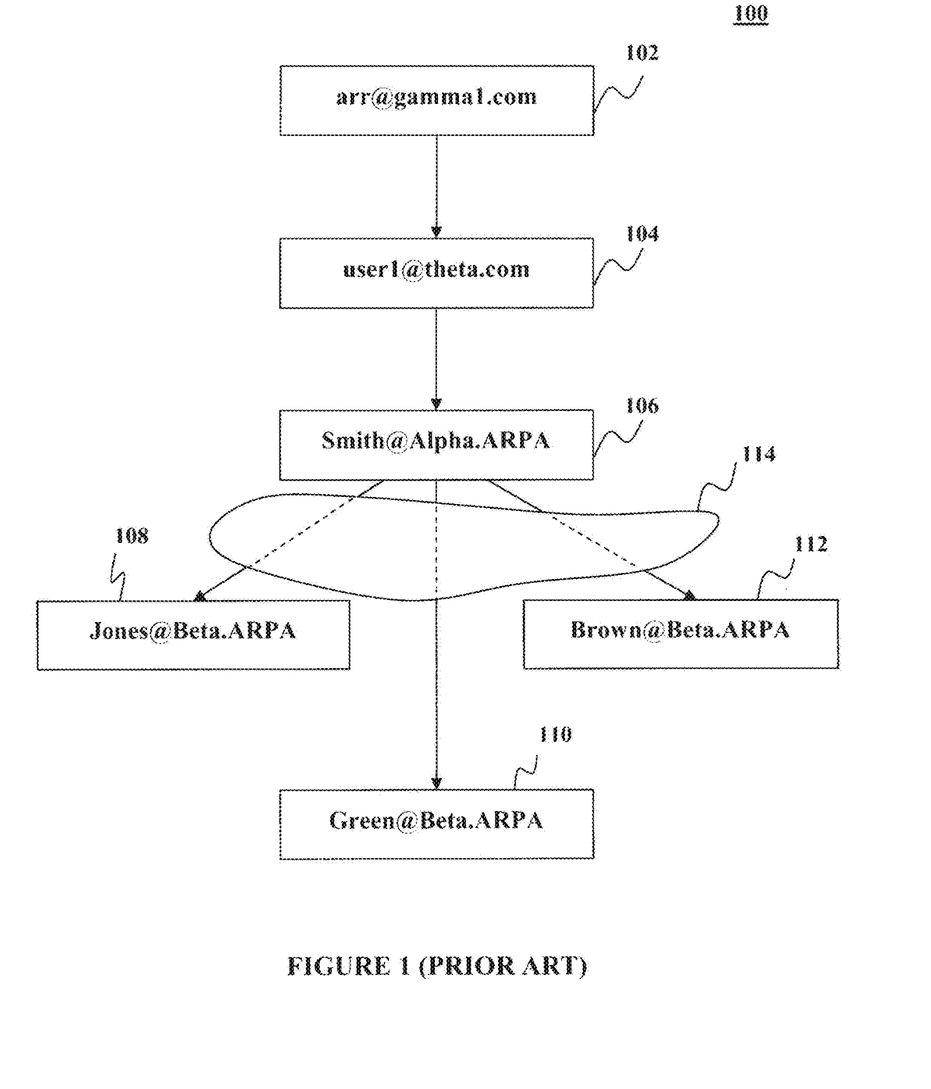
FIG. 1 shows a high-level conventional schematic of an electronic mail network.

FIG. 1 shows a high-level conventional schematic of an electronic mail network 100. FIG. 1 depicts a sender 102 (henceforth referred to as "arr") with an e-mail address address 'arr@gamma1.com'. Arr 102 has sent an e-mail to a recipient 104 (henceforth referred to as "user1") with an e-mail address 'user1@theta.com'. User1, in turn has forwarded the e-mail with possibly some additional message, to a recipient 106 (henceforth referred to as "Smith") with an e-mail address 'Smith@Alpha.ARPA'. Smith 106 wishes to send the e-mail with possibly some addition, to three recipients: a recipient 108 (henceforth referred to as "Jones") with an e-mail address 'Jones@Beta.ARPA', a recipient 110 (henceforth referred to as "Green") with an e-mail address 'Green@Beta.ARPA' and a recipient 112 (henceforth referred to as "Brown") with e-mail address 'Brown@Beta.ARPA'. Recipients 106, 108, 110 and 112 are configured to communicate via a communication network 114.

Figure 2A:
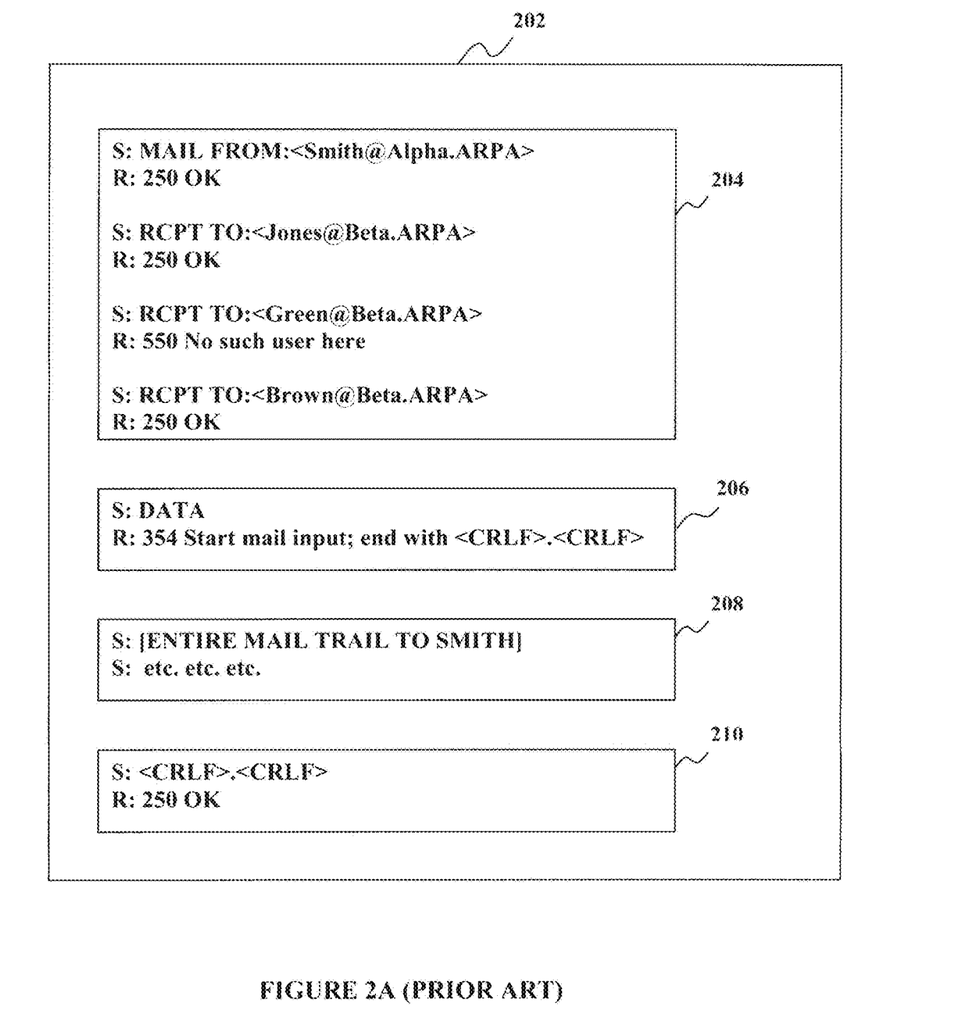
FIG. 2A schematically illustrates a conventional SMTP command list corresponding to the electronic mail network of FIG. 1.

FIG. 2A illustrates a schematic of a conventional SMTP command list 202 corresponding to an electronic mail in communication network 100 of FIG. 1. Elements 204, 206, 208, and 210 are parts of command list 202. The elements 204 through 210 are created and shown in a manner for easy illustration, and as such are not in that format in the SMTP command list. Further, for illustration purposes here (not part of the SMTP protocol), the commands in command list 202 are prefixed for the Receiver (R:) and the Sender (S:). Various elements 204 through 210, in command list 202 depict various aspects of the conventional SMTP command list.

Some useful parameters or commands are listed next, for better understanding of elements of command list 202. 'MAIL FROM:<source email address>' is the start of an e-mail message. The source e-mail address is what will appear in the "From:" field of the message. 'RCPT TO:<destination e-mail address>' identifies the recipient of the e-mail message. This command can be repeated multiple times for a given message in order to deliver a single message to multiple recipients. The e-mail addresses or their equivalents will appear in the "To:" field of the message. A DATA parameter, also referred to as a DATA command, signifies that a stream of data, i.e. the e-mail message body, will follow.

Element 204 which is a part of command list 202 depicts the recipients and the sender of an e-mail. The sender notifies the receiver of the originating e-mail address of the e-mail message in a 'MAIL FROM' command. Command list 202 depicts that the e-mail message is being sent by Smith 106 of FIG. 1, to three mailboxes on the same SMTP server: one each for each recipient Jones 108, Green 110 and Brown 112 all of FIG. 1. The corresponding SMTP command is 'RCPT TO'. Each successful reception and execution of a command is acknowledged by each of the e-recipients with a result code and response message (e.g., R:250 OK).

Element 206 is another component of command list 202, which depicts that the transmission of the body of the e-mail message initiated with a DATA command. Element 208 is the entire text message that Smith 106 is sending to various recipients and may include the e-mail that Smith received from user1 104 and also from arr 102. Element 210 depicts that the e-mail message is terminated with a (<CRLF>.<CRLF>) with just a single full stop (period) between the two <CRLF>. Between the first DATA command of element 206 and the <CRLF>.<CRLF> of element 210, the complete contents of the e-mail reside. So until the <CRLF>.<CRLF> command is received, the system will not perceive the intermediary 'RCPT TO' and 'MAIL FROM' commands as separate e-mails. They are essentially forwarded contents, in bulk.

Figure 2B:
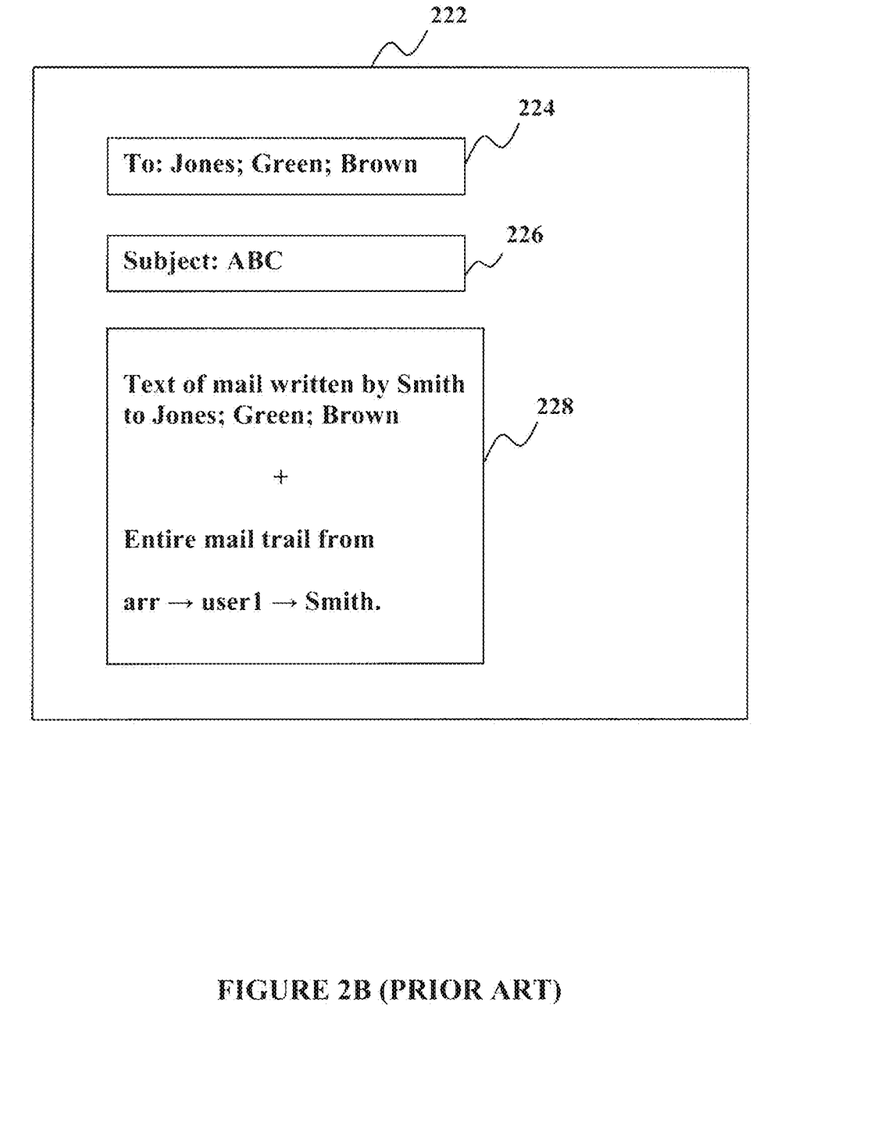
FIG. 2B schematically illustrates a conventional user interface corresponding to the SMTP command list shown in FIG. 2A.

FIG. 2B illustrates a schematic of a conventional user interface 222, as found in the prior art, corresponding to conventional SMTP command list 202 of FIG. 2A. User interface 222 depicts three elements, viz. an element 224, an element 226 and an element 228. Element 224 depicts the list of recipients of the e-mail message to be sent by sender Smith 106 of FIG. 1. Element 224, therefore, enlists "To: Jones; Green; Brown", corresponding to three 'RCPT TO' commands of element 204 of FIG. 2A. These recipients correspond to Jones 108, Green 110 and Brown 112, all three of FIG. 1. Element 226 depicts 'Subject: ABC'. Subject line ABC 226 is text entered by Smith 106. Element 228 depicts the entire text entered by Smith 106, and if Smith forwards the e-mail received from user1 104, then element 228 also includes the entire e-mail trail from arr 102 to user1 and from user1 to Smith. If Smith 106 intends to selectively forward the e-mail trail, conventionally, Smith would need to manually edit the entire e-mail trail.

If Smith 106 forwards the e-mail received from user1 104, then element 228 also includes the entire e-mail trail from arr 102 to user1 and from user 1 to Smith. In conventional mode, for Smith 106, it may not be possible to verify if e-mail from arr 102 to user1 104 was digitally signed or not. A property, such as, 'digital signature' may not be verifiable in conventional mode of e-mail forwarding. Similarly, other properties, such as, for example, "encryption' may not be easily applied and preserved for each of arr 102 and user1 104.

Figure 3A:
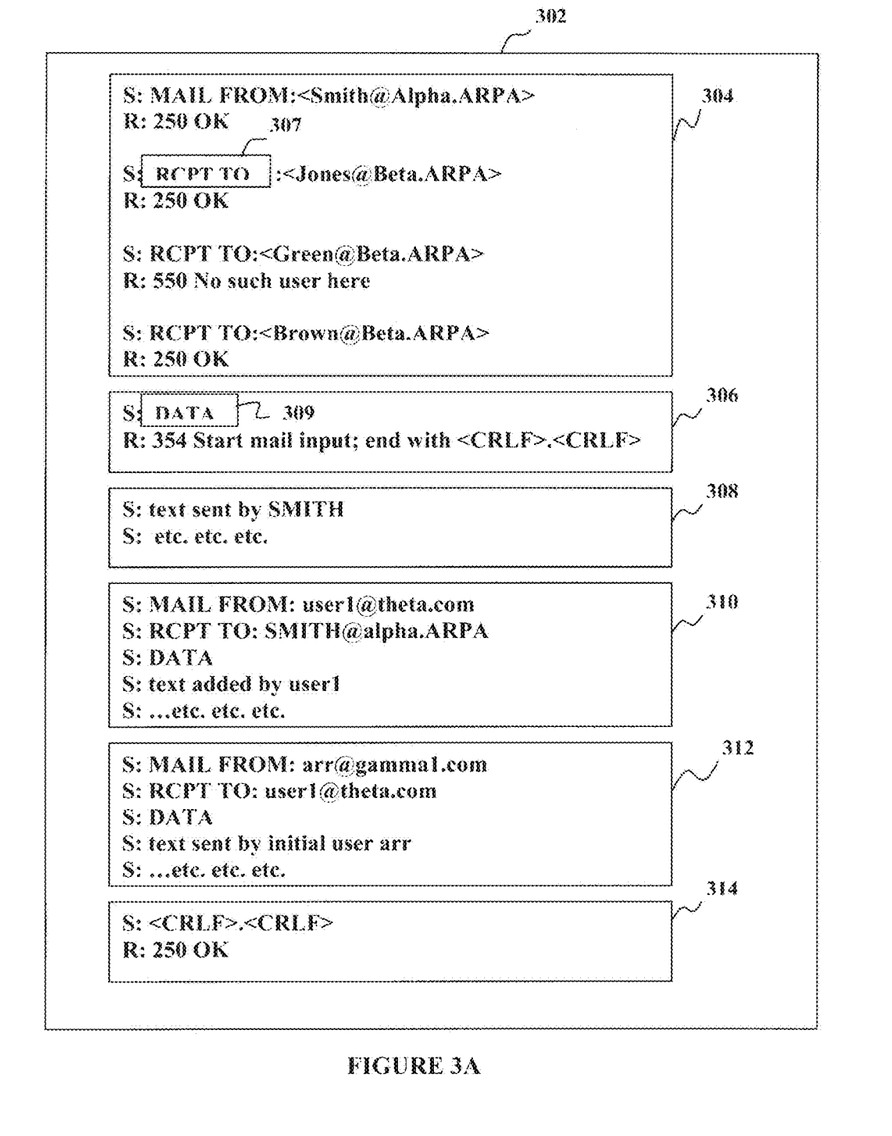
FIG. 3A schematically illustrates an SMTP command list corresponding to the electronic mail network of FIG. 1, according to an exemplary embodiment of the invention.

FIG. 3A illustrates a schematic of an SMTP command list 302 according to an exemplary embodiment of the invention. Elements 304, 306, 308, 310, 312 and 314 are partitions of command list 302, termed hereinafter as 'command sub-lists' of the command list, according to an embodiment of the invention. All of the command sub-lists will be individually described. Command list 302 is partitioned into these command sub-lists, 304, 306, 308, 310, 312, and 314, using recursive parameters of the command list. A plurality of recursive parameters are provided, and in an exemplary mode, one of the recursive parameters is a DATA parameter. In conventional mode, there may be other parameters that are included in the plurality of recursive parameters, such as, for example, 'RCPT TO', however conventionally there is a single DATA parameter. Parameter 'RCPT TO' 307 is depicted as an exemplary recursive parameter. Introduction of a plurality of DATA parameters, depicted as 309, facilitates better managing of an electronic mail and is further described in detail below. RCPT TO 307 is a recursive parameter and is part of command sub-list 304, command sub-list 310, and command sub-list 312. DATA parameter 309 is a recursive parameter according to an embodiment of the invention and is part of command sub-lists 306, 310, and 312. For illustration purposes (not part of SMTP protocol), the commands in command list 302 are prefixed for the Receiver (R:) and the Sender (S:). Various elements in command list 302 depict various aspects of the conventional SMTP command list.

Command sub-list 304 identifies the recipients and the sender of the electronic mail. The sender notifies the recipient of the originating e-mail address of the message in a 'MAIL FROM' command. Command list 302 depicts that the e-mail message is being sent by sender Smith 106 to three mailboxes on the same SMTP server: one each for each recipient Jones 108, Green 110 and Brown 112. The corresponding SMTP command is 'RCPT TO'. Each successful reception and execution of a command is acknowledged by each of the receivers with a result code and response message (e.g., R:250 OK). Command sub-list 306 is another component of command list 302, which depicts that the transmission of the body of the e-mail message is initiated with a DATA command and later is transmitted verbatim line by line. Command sub-lists 304 and 306 are similar to elements 204 and 206 of FIG. 2A.

Command sub-list 308 is a text message that sender Smith 106 is sending to various recipients. Smith 106 intends to also include the e-mail that Smith received from user1 104 and also from arr 102. Just as before in command list 202 of FIG. 2A, the complete contents of the e-mail reside between the first DATA parameter of command sub-list 306 and the <CRLF>.<CRLF> of command sub-list 314. The system now will, unlike in command list 202 of FIG. 2A, be able to identify multiple separate e-mails due to the intermediary 'RCPT TO' and 'MAIL FROM' commands in conjunction with the plurality of introduced DATA parameters, until the <CRLF>.<CRLF> command is received. What was part of the entire content of element 208 of FIG. 2A, now can be split using second DATA parameter in command sub-list 310 and third DATA parameter in command sub-list 312. By identifying the presence of MAIL FROM (user1 104) and RCPT TO (Smith 106) in command sub-list 310, the second DATA parameter enables identification of e-mail sent by user1 to Smith. Command sub-list 310 also identifies text added by user1 104 to Smith 106. While user1 104 has sent an e-mail to Smith 106, it is a forwarded e-mail from arr 102.

Command sub-list 312 depicts the third instance of a DATA parameter along with MAIL FROM (arr 102) and RCPT TO (user1 104) parameters. What was part of the entire content of element 208 (see FIG. 2A), now can be further split using the third DATA parameter in command sub-list 312. Identifying the presence of MAIL FROM (arr 102) and RCPT TO (user1 104) in command sub-list 312, the third DATA parameter enables identification of mail sent by arr to user1. Command sub-list 312 also identifies text added by arr 102 to user1 104.

Command sub-list 314 depicts that the e-mail message is terminated with a (<CRLF>.<CRLF>) with just a single full stop (period) between the two <CRLF>.

Figure 3B:
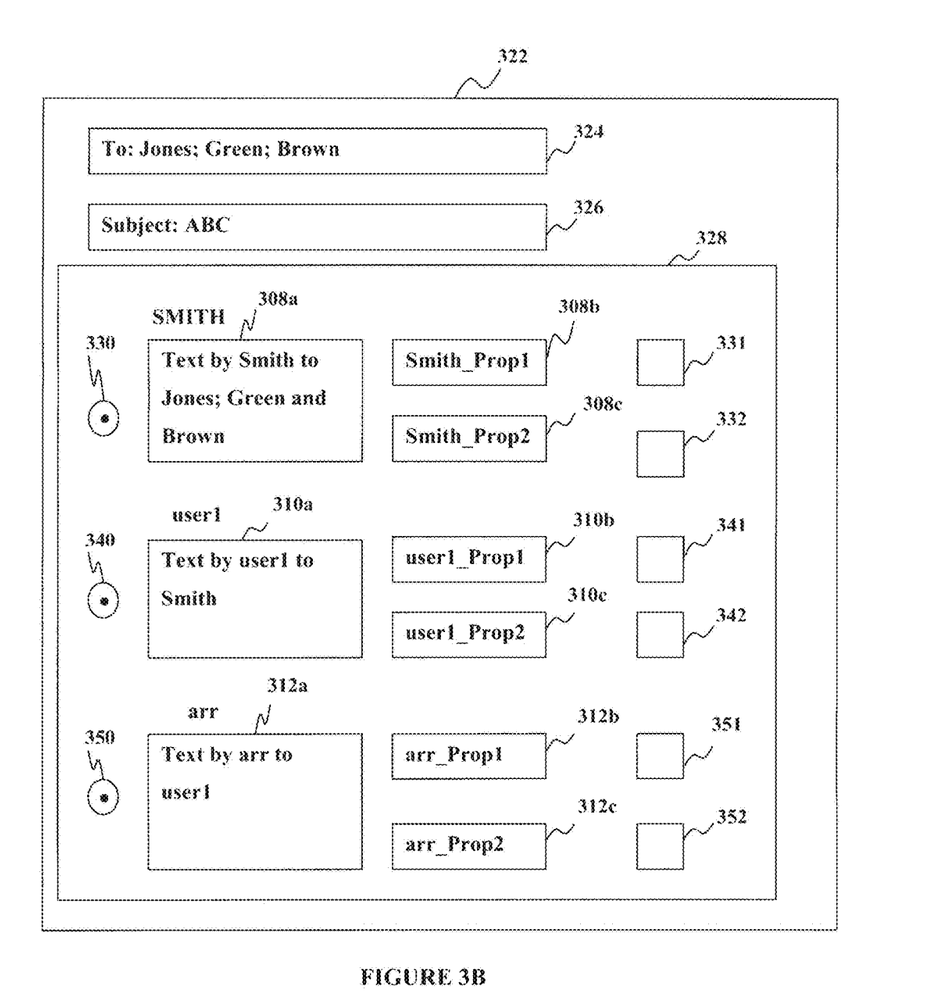
FIG. 3B schematically illustrates a user interface corresponding to the SMTP command list of FIG. 3A, according to an exemplary embodiment of the invention.

FIG. 3B illustrates a schematic of a user interface 322, according to an exemplary embodiment of the invention, corresponding to the SMTP command list 302 of FIG. 3A. User interface 322 depicts three elements 324, 326, 328. Element 324 depicts the list of recipients of the e-mail message to be sent by sender Smith 106. Element 324, therefore, enlists "Jones; Green; and Brown", corresponding to three 'RCPT TO' commands of command sub-list 304 of FIG. 3A. These recipients correspond to Jones 108, Green 110 and Brown 112. Element 326 depicts 'Subject: ABC'. Subject line ABC 326 is text entered by Smith 106.

Element 328 depicts text element 308a corresponding to text entered by Smith 106 in command sub-list 308 of FIG. 3A. Element 328 further depicts elements 308b (Smith_Prop1) and 308c (Smith_Prop2) which correspond to properties of command sub-list 308. Elements 330, 331 and 332 are user interface elements, corresponding to command sub-list 308. Similarly, text element 310a corresponds to text entered by user1 104 in command sub-list 310 of FIG. 3A. Element 328 further depicts elements 310b (user1_Prop1) and 310c (user1_Prop2) which correspond to properties of command sub-list 310. Elements 340, 341 and 342 are user interface elements, corresponding to command sub-list 310. Similarly further, text element 312a corresponds to text entered by arr 102 in command sub-list 312 of FIG. 3A. Element 328 further depicts elements 312b (arr$_{13}$ Prop1) and 312c (arr$_{13}$ Prop2) that correspond to properties of command sub-list 312. Elements 350, 351 and 352 are user interface elements, corresponding to command sub-list 312.

Property "Prop1" corresponding to elements 308b, or 310b or 312b may be, for example, a digital signature. Property "Prop2" corresponding to elements 308c, or 310c or 312c may be, for example, an encryption. There are several other properties possible, such as, for example, a return receipt, a priority, a confidentiality or a mood stamp. Elements 330, 331, 332, 340, 341, 342, 350, 351, 352 are exemplary graphical user interfaces (GUI). In an exemplary mode, GUI may be a checkbox, a radio button or a dropdown list. In the exemplary mode, elements 330, 340 and 350 are radio button GUIs. In the exemplary mode, elements 331, 332, 341, 342, 351 and 352 are checkbox GUIs.

If Smith 106 wishes to forward the e-mail received from user1 104, then radio button GUI element 340 should be checked by Smith 106. If Smith 106 intends to include digital signature property 310b of user1 104, then checkbox GUI element 341 should be checked by Smith. If Smith 106 intends to not include encryption property 310c of user1 104, then checkbox GUI element 342 should be left unchecked. Similarly, if text of the e-mail message from arr 102 to user1 104 is to be omitted, radio button GUI 350 should be left unchecked. If Smith 106 intends to send digital signature and encryption to all the recipients for the e-mail from Smith 106, both the checkbox GUI elements 331 and 332 need to be checked by Smith 106. This helps eliminate the need to manually edit any e-mail trail and enables preservation and inclusion of text and other e-mail properties related information, as needed. If encryption or/and digital signature is/are forwarded in an e-mail sent by Smith 106, the recipients may be able to verify these properties. For instance, in the case of the digital signature, the recipients may use the initial sender's public key.

Figure 4:
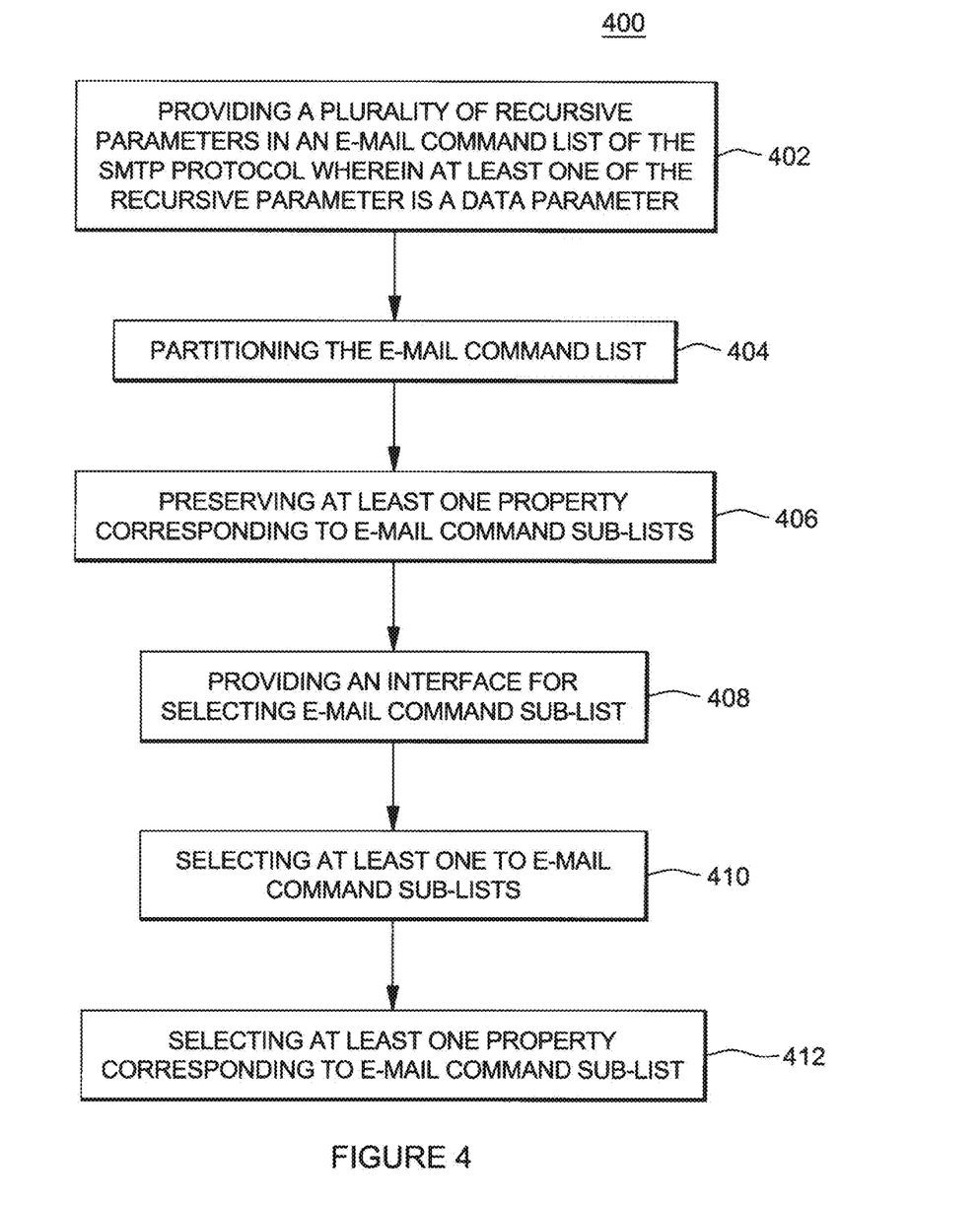
FIG. 4 shows a process for managing an electronic mail in a communication network, according to an embodiment of the invention.

FIG. 4 shows a flow chart illustrating a general process 400 for managing an electronic mail in a communication network, according to an embodiment of the invention. By way of example, a user, such as Smith 106 may have received a forwarded e-mail from user1 104, which in turn has received and included an e-mail from arr 102. Smith 106 intends to forward the received e-mail with additional text to three recipients, Jones 108, Green 110 and Brown 112. Jones 108, Green 110 and Brown 112 are communicatively coupled with Smith 106 in a communication network similar to communication network 114 of FIG. 1. Step 402 depicts providing a plurality of recursive parameters in a command list 302 of FIG. 3A of a communication protocol associated with the electronic mail, wherein at least one of the recursive parameters is a DATA parameter 309 (FIG. 3A) specifying information of the electronic mail. The communication protocol is at least one of SMTP, POPx or IMAP. There may be other recursive parameters, such as, for example, "RCPT TO" 307 of FIG. 3A. Step 404 depicts partitioning command list 302 into a plurality of command sub-lists, such as, for example, 304, using the plurality of recursive parameters, such as, for example, DATA parameter 309.

Step 406 depicts preserving at least one property corresponding to each of the e-mail command sub-lists. Two exemplary properties for command sub-list corresponding to 310 of FIG. 3A are depicted as user1_Prop1 310b and user1_Prop2 310c of FIG. 3B. In an exemplary mode, user1_Prop1 310b may be a digital signature of user1 104 and user1_Prop2 310c may be encryption for e-mail content of user1. The property can be a cipher corresponding to each of the command sub-lists. The property may be one of, but not limited to, an encryption key, a digital signature, a return receipt, a priority, a confidentiality and a mood stamp corresponding to each of the command sub-lists. Step 408 depicts providing an interface for selecting each of the command sub-lists. The interface in an exemplary mode can be a GUI. The GUI, in turn, may be one of, but not limited to, a checkbox, a radio button, and a dropdown list. In an exemplary mode, GUI element radio button 340 of FIG. 3B is used to select command sub-list 310 corresponding to the e-mail of user1 104. Step 410 depicts selecting at least one of the command sub-lists, and step 412 shows identifying the at least one property corresponding to each of the e-mail command sub-lists. In an exemplary mode, an encryption property 312c of FIG. 3A, corresponding to command sub-list 312 for the e-mail from arr 102, can be identified using a checkbox 352 of FIG. 3B corresponding to a GUI.

Figure 5:
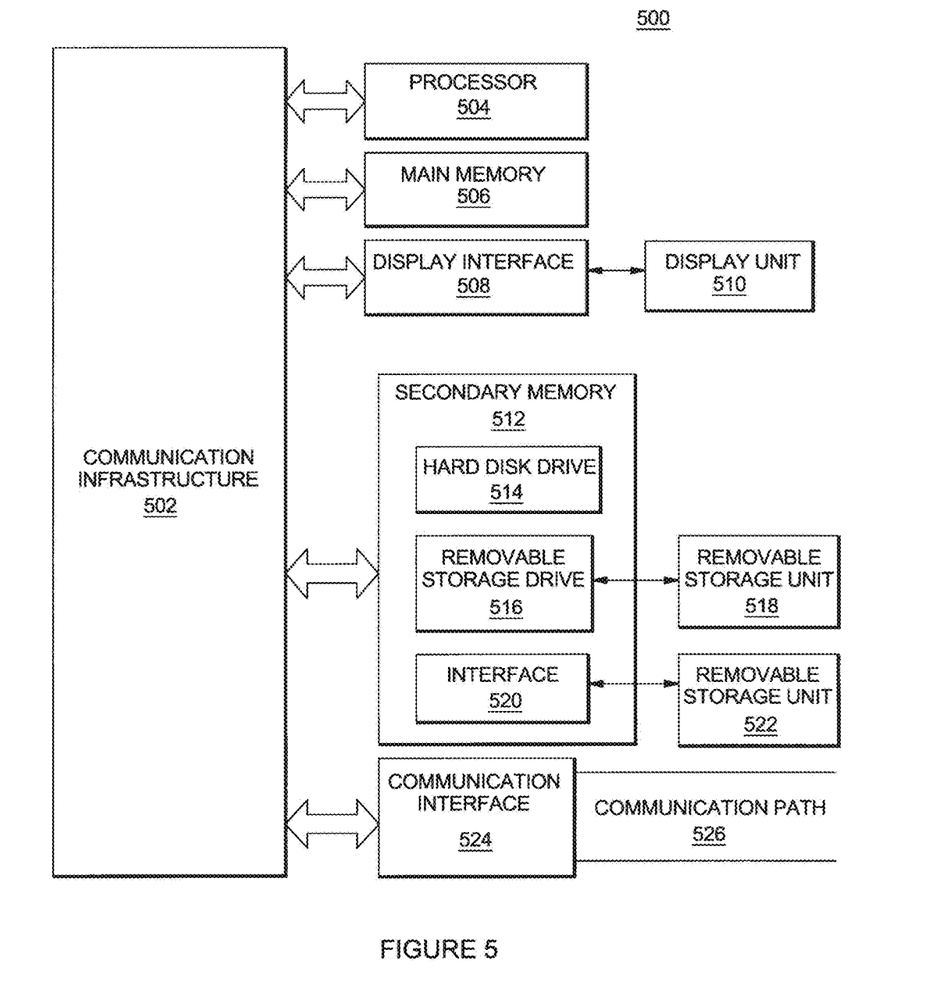
FIG. 5 shows a detailed schematic of a computer system used for managing an electronic mail in a communication network, as shown in FIG. 4.

FIG. 5 is a block diagram of an exemplary computer system 500 that can be used for implementing various embodiments of the present invention. In some embodiments, the computer system 500 can be used for managing an electronic mail in a communication network, as shown in FIG. 3A and FIG. 3B. In some other embodiments, the computer system 500 can be used to implement the process for managing an electronic mail in a communication network, as shown in FIG. 4.

Computer system 500 includes a processor 504. It should be understood although FIG. 5 illustrates a single processor, one skilled in the art would appreciate that more than one processor can be included as needed. Processor 504 is connected to a communication infrastructure 502 (for example, a communications bus, cross-over bar, or network) where communication infrastructure 502 is configured to facilitate communication between various elements of the exemplary computer system 500. Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 configured to forward graphics, text, and other data from communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCM-CIA slot and card, etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. These propagated signals are provided to communications interface 524 via a communications path (that is, channel) 526. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Advantages of various embodiments of the invention include selective forwarding of e-mails, without necessity of manual modifications. Advantages of various embodiments of the invention include preserving multiple properties associated with e-mails, such as, for example, digital signature and encryption.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Elements that are in communication with each other need not be in continuous communication with each other, unless expressly specified otherwise. In addition, elements that are in communication with each other may communicate directly or indirectly through one or more intermediaries.

Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method for managing an electronic mail, said method comprising:

during a Simple Mail Transfer Protocol (SMTP) session, conducted in a computer system, in which commands are initiated by a SMTP client and responses are from a SMTP server through which the SMTP session is opened:

partitioning, by a processor of the computer system, a SMTP command list of a communication SMTP electronic mail transmission protocol associated with the electronic mail into a plurality of command sub-lists using a plurality of recursive parameters appearing in the SMTP command list prior to said partitioning, wherein each recursive parameter is a formal standard SMTP command that is repeated in respective command sub-lists as a result of said partitioning, wherein the plurality of recursive parameters comprises a DATA parameter appearing in two different command sub-lists of the plurality of command sub-lists, wherein the DATA parameter appearing in the two different command sub-lists specify respective information of the electronic mail, wherein all command sub-lists of the plurality of command sub-lists are viewable simultaneously in a user interface of the computer system, wherein each command sub-list in the user interface comprises at least one command pertaining to a receiver or sender of the electronic mail, and wherein each command sub-list in the user interface is individually selectable, via the user interface, for subsequent use of the at least one command in a subsequently selected command sub-list in implementing the electronic mail; and said processor receiving a selection, via the user interface, of at least one of the command sub-lists viewable in the user interface subject to the at least one command in each selected command sub-list being viewable in the user interface prior to said selecting, wherein each command of the at least one command specifies a respective aspect of how to implement the electronic mail in a subsequent implementation of the electronic mail; and wherein the electronic mail is from a current sender to a receiver, wherein the plurality of command sub-lists comprise a plurality of message sub-lists which include messages from the current sender to the receiver via the electronic mail, wherein the plurality of message sub-lists comprises a first preceding message sub-list and a second preceding message sub-list, wherein the first preceding message sub-list comprises a first preceding message from a first preceding sender to the current sender, wherein the second preceding message sub-list comprises a second preceding message from a second preceding sender to the first preceding sender, and wherein the first preceding message and the second preceding message are included in the messages from the current sender to the receiver via the electronic mail.

2. The method of claim 1, wherein the respective information of the electronic mail are viewable simultaneously.

3. The method of claim 1, said method further comprising:
said processor receiving a selection, via the user interface, of at least one property corresponding to each selected command sub-list, for subsequent use in implementing the electronic mail.

4. The method of claim 3, wherein the at least one property corresponding to each selected command sub-list is selected from the group consisting of a cipher, an encryption key, a digital signature, a return receipt, a priority, a confidentiality, a mood stamp, and combinations thereof.

5. The method of claim 1, wherein each command sub-list consists of at least one text string, each text string being either (i) a sender-originated text string of a communication from the current sender to the receiver and prefixed by a sender symbol denoting that the sender-originated text string originated from the sender or (ii) a receiver-originated text string of a communication from the receiver to the current sender and prefixed by a receiver symbol denoting that the receiver-originated text string originated from the receiver.

6. The method of claim 5, wherein each recursive parameter is unique, and wherein each recursive parameter appears in at least one sender-originated text string in at least two command sub-lists of the plurality of command sub-lists.

7. The method of claim 1, said method further comprising:
preserving one or more properties corresponding to each command sub-list of the plurality of command sub-lists.

8. The method of claim 1,
wherein the plurality of message sub-lists further comprises a body message sub-list, and
wherein the body message sub-list comprises a body of an electronic mail message in the electronic mail.

9. A computer program product, comprising a computer readable hardware storage device having computer readable program code stored therein, said program code containing instructions executable by a processor of a computer system to implement a method for managing an electronic mail, said method comprising:

during a Simple Mail Transfer Protocol (SMTP) session, conducted in the computer system, in which commands are initiated by a SMTP client and responses are from a SMTP server through which the SMTP session is opened:

said processor partitioning a SMTP command list of a communication SMTP electronic mail transmission protocol associated with the electronic mail into a plurality of command sub-lists using a plurality of recursive parameters appearing in the SMTP command list prior to said partitioning, wherein each recursive parameter is a formal standard SMTP command that is repeated in respective command sub-lists as a result of said partitioning, wherein the plurality of recursive parameters comprises a DATA parameter appearing in two different command sub-lists of the plurality of command sub-lists, wherein the DATA parameter appearing in the two different command sub-lists specify respective information of the electronic mail, wherein all command sub-lists of the plurality of command sub-lists are viewable simultaneously in a user interface of the computer system, wherein each command sub-list in the user interface comprises at least one command pertaining to a receiver or sender of the electronic mail, and wherein each command sub-list in the user interface is individually selectable, via the user interface, for subsequent use of the at least one command in a subsequently selected command sub-list in implementing the electronic mail; and said processor receiving a selection, via the user interface, of at least one of the command sub-lists viewable in the user interface subject to the at least one command in each selected command sub-list being viewable in the user interface prior to said selecting, wherein each command of the at least one command specifies a respective aspect of how to implement the electronic mail in a subsequent implementation of the electronic mail; and wherein the electronic mail is from a current sender to a receiver, wherein the plurality of command sub-lists comprise a plurality of message sub-lists which include messages from the current sender to the receiver via the electronic mail, wherein the plurality of message sub-lists comprises a first preceding message sub-list and a second preceding message sub-list, wherein the first preceding message sub-list comprises a first preceding message from a first preceding sender to the current sender, wherein the second preceding message sub-list comprises a second preceding message from a second preceding sender to the first preceding sender, and wherein the first preceding message and the second preceding message are included in the messages from the current sender to the receiver via the electronic mail.

10. The computer program product of claim 9, wherein the respective information of the electronic mail are viewable simultaneously.

11. The computer program product of claim 9, said method further comprising:

said processor receiving a selection, via the user interface, of at least one property corresponding to each selected command sub-list, for subsequent use in implementing the electronic mail.

12. The computer program product of claim 11, wherein the at least one property corresponding to each selected command sub-list is selected from the group consisting of a cipher, an encryption key, a digital signature, a return receipt, a priority, a confidentiality, a mood stamp, and combinations thereof.

13. The computer program product of claim 9, wherein each command sub-list consists of at least one text string, each text string being either (i) a sender-originated text string of a communication from the current sender to the receiver and prefixed by a sender symbol denoting that the sender-originated text string originated from the sender or (ii) a receiver-originated text string of a communication from the receiver to the current sender and prefixed by a receiver symbol denoting that the receiver-originated text string originated from the receiver.

14. The computer program product of claim 13, wherein each recursive parameter is unique, and wherein each recursive parameter appears in at least one sender-originated text string in at least two command sub-lists of the plurality of command sub-lists.

15. A computer system comprising a processor, a memory coupled to the processor, and a computer readable storage device coupled to the processor, said storage device containing program code executable by the processor via the memory to implement a method for managing an electronic mail, the method comprising:

during a Simple Mail Transfer Protocol (SMTP) session, conducted in the computer system, in which commands are initiated by a SMTP client and responses are from a SMTP server through which the SMTP session is opened:

said processor partitioning a SMTP command list of a communication SMTP electronic mail transmission protocol associated with the electronic mail into a plurality of command sub-lists using a plurality of recursive parameters appearing in the SMTP command list prior to said partitioning, wherein each recursive parameter is a formal standard SMTP command that is repeated in respective command sub-lists as a result of said partitioning, wherein the plurality of recursive parameters comprises a DATA parameter appearing in two different command sub-lists of the plurality of command sub-lists, wherein the DATA parameter appearing in the two different command sub-lists specify respective information of the electronic mail, wherein all command sub-lists of the plurality of command sub-lists are viewable simultaneously in a user interface of the computer system, wherein each command sub-list in the user interface comprises at least one command pertaining to a receiver or sender of the electronic mail, and wherein each command sub-list in the user interface is individually selectable, via the user interface, for subsequent use of the at least one command in a subsequently selected command sub-list in implementing the electronic mail; and said processor receiving a selection, via the user interface, of at least one of the command sub-lists viewable in the user interface subject to the at least one command in each selected command sub-list being viewable in the user interface prior to said selecting, wherein each command of the at least one command specifies a respective aspect of how to implement the electronic mail in a subsequent implementation of the electronic mail; and wherein the electronic mail is from a current sender to a receiver, wherein the plurality of command sub-lists comprise a plurality of message sub-lists which include messages from the current sender to the receiver via the electronic mail, wherein the plurality of message sub-lists comprises a first preceding message sub-list and a second preceding message sub-list, wherein the first preceding message sub-list comprises a first preceding message from a first preceding sender to the current sender, wherein the second preceding message sub-list comprises a second preceding message from a second preceding sender to the first preceding sender, and wherein the first preceding message and the second preceding message are included in the messages from the current sender to the receiver via the electronic mail.

16. The computer system of claim 15, wherein the respective information of the electronic mail are viewable simultaneously.

17. The computer system of claim 15, said method further comprising:

said processor receiving a selection, via the user interface, of at least one property corresponding to each selected command sub-list, for subsequent use in implementing the electronic mail.

18. The computer system of claim 17, wherein the at least one property corresponding to each selected command sub-list is selected from the group consisting of a cipher, an encryption key, a digital signature, a return receipt, a priority, a confidentiality, a mood stamp, and combinations thereof.

19. The computer system of claim 15, wherein each command sub-list consists of at least one text string, each text string being either (i) a sender-originated text string of a communication from the current sender to the receiver and prefixed by a sender symbol denoting that the sender-originated text string originated from the sender or (ii) a receiver-originated text string of a communication from the receiver to the current sender and prefixed by a receiver symbol denoting that the receiver-originated text string originated from the receiver.

20. The computer system of claim 19, wherein each recursive parameter is unique, and wherein each recursive parameter appears in at least one sender-originated text string in at least two command sub-lists of the plurality of command sub-lists.

* * * * *